United States Patent
Yang et al.

(10) Patent No.: US 10,811,185 B2
(45) Date of Patent: Oct. 20, 2020

(54) SATURATION PREVENTION OF CURRENT TRANSFORMER

(71) Applicant: Analog Devices Global Unlimited Company, Hamilton (BM)

(72) Inventors: Liuqing Yang, Shanghai (CN); Jian Ye, Shanghai (CN); Zhijie Zhu, Shanghai (CN)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 16/130,899

(22) Filed: Sep. 13, 2018

(65) Prior Publication Data

US 2020/0090861 A1 Mar. 19, 2020

(51) Int. Cl.
*H02M 3/335* (2006.01)
*H01F 27/40* (2006.01)
(Continued)

(52) U.S. Cl.
CPC ............ *H01F 27/402* (2013.01); *H02M 1/40* (2013.01); *H02M 3/335* (2013.01); *H02M 7/068* (2013.01)

(58) Field of Classification Search
CPC .. H02M 2003/1552; H02M 1/12; H02M 1/42; H02M 1/4225; H02M 1/4233;
(Continued)

(56) References Cited

U.S. PATENT DOCUMENTS 3,634,729 A 1/1972 Hendry et al.
3,846,675 A 11/1974 Shimp
(Continued)

FOREIGN PATENT DOCUMENTS

CN 201966149 U 9/2011
CN 106771995 A 5/2017
(Continued)

OTHER PUBLICATIONS

C. Gu et al., "Semiconductor Devices in Solid-State/Hybrid Circuit Breakers: Current Status and Future Trends," Energies, Apr. 6, 2017, pp. 1-25, 10-495, MDPI.
(Continued)

*Primary Examiner* — Bryan R Perez
(74) *Attorney, Agent, or Firm* — Schwegman Lundberg & Woessner, P.A.

(57) ABSTRACT

The subject disclosure provides for utilizing pulse width modulation (PWM) signaling to influence a closed loop of a shunt boost controller and reduce an imbalance of a load. The imbalance reduction helps reduce remanence of a current transformer (CT) and thereby prevent saturation of the CT. A shunt boost controller provides the control signal to control flow of current to the load. A feedback network provides a feedback signal to the shunt boost controller based on a direct current (DC) voltage and causes a power switch circuit to turn on when a magnitude of the feedback signal exceeds a threshold magnitude. The PWM generator supplies a PWM signal to cause the control signal to be provided more symmetrical to the power switch circuit and causes the power switch circuit to turn on more frequently with the control signal to reduce the imbalance of the load.

19 Claims, 7 Drawing Sheets

(51) Int. Cl.
*H02M 7/06* (2006.01)
*H02M 1/40* (2007.01)

(58) Field of Classification Search
CPC .. H02M 1/4241; H02M 1/4258; H02M 1/425; H02M 1/4208; H02M 2001/4283; H02M 2001/4291; G05F 1/70; H02J 3/16
USPC .......................... 323/205, 207, 222, 263, 289
See application file for complete search history.

(56) References Cited

U.S. PATENT DOCUMENTS

| | | | |
|---|---|---|---|
| 4,271,447 A | | 6/1981 | Howell |
| 4,542,440 A | | 9/1985 | Chetty et al. |
| 4,565,958 A | | 1/1986 | Cooper |
| 5,710,697 A | | 1/1998 | Cooke et al. |
| 5,867,379 A | * | 2/1999 | Maksimovic ....... H02M 1/4225 323/222 |
| 6,081,437 A | | 6/2000 | Chen et al. |
| 7,268,558 B2 | | 9/2007 | Mills et al. |
| 7,573,249 B2 | | 8/2009 | Sutardja et al. |
| 7,869,169 B2 | | 1/2011 | Davison et al. |
| 2002/0093774 A1 | | 7/2002 | Chung |
| 2003/0174005 A1 | | 9/2003 | Latham, II et al. |
| 2008/0111594 A1 | * | 5/2008 | Ito ........................... H02M 1/36 327/143 |
| 2011/0096242 A1 | * | 4/2011 | Joo ........................... G05F 1/70 348/730 |
| 2012/0327695 A1 | * | 12/2012 | Fischer ............... H02M 1/4208 363/74 |
| 2013/0155553 A1 | | 6/2013 | Kawasaki et al. |
| 2014/0103863 A1 | * | 4/2014 | Fassnacht ........... H02M 1/4225 320/107 |
| 2014/0369097 A1 | * | 12/2014 | Prescott .............. H02M 1/4225 363/89 |
| 2015/0326141 A1 | * | 11/2015 | Takahashi ............... H01F 30/00 363/126 |
| 2017/0214322 A1 | | 7/2017 | Lin et al. |

FOREIGN PATENT DOCUMENTS

| | | |
|---|---|---|
| CN | 107272792 A | 10/2017 |
| EP | 0720193 A1 | 7/1996 |
| IN | 2012MU00989 A | 11/2013 |
| IN | 2014MU01132 A | 10/2015 |
| JP | H0710145 B2 | 2/1995 |
| JP | 2015146712 A | 8/2015 |

OTHER PUBLICATIONS

G. De Lange et al., "Novel Application of PWM Switching for DC Traction Circuit Breakers," IEEE, 2006.

* cited by examiner

SATURATION PREVENTION OF CURRENT TRANSFORMER

FIELD OF THE DISCLOSURE

The present description relates generally to power converter systems, and more particularly, to saturation prevention of current transformer.

BACKGROUND

Figure 1A:
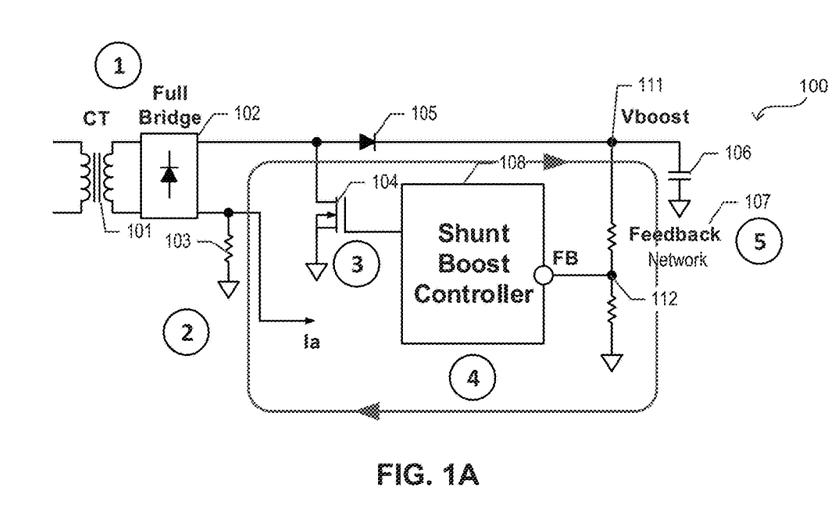
FIGS. 1A and 1B illustrate a schematic diagram of an example of a shunt boost power supply system in accordance with one or more implementations of the subject technology.

In module case circuit breaker (MCCB) applications, a current transformer (CT) is used as a shunt boost power supply as well as used to provide the alternating current (AC) information (e.g., FIG. 1, Ia). When the current transformer is used as a shunt-boost based power supply, as the load of the CT is unsymmetrical during a whole AC cycle due to the shunt boost topology, there will be remanence in the current transformer under a certain load condition and causes the CT into saturation. Because the CT also provides the sensed current information in a MCCB application, when saturation happens, the accuracy and linearity of the sensed current signal is influenced.

SUMMARY OF THE DISCLOSURE

The subject disclosure provides for utilizing pulse width modulation (PWM) signaling to influence a closed loop of a shunt boost controller and reduce an imbalance of a load. The imbalance reduction helps reduce remanence of a current transformer (CT) and thereby prevent saturation of the CT. A shunt boost controller provides the control signal to control flow of current to the load. A feedback network provides a feedback signal to the shunt boost controller based on a direct current (DC) voltage and causes a power switch circuit to turn on when a magnitude of the feedback signal exceeds a threshold magnitude. The PWM generator supplies a PWM signal to cause the control signal to be provided more symmetrical to the power switch circuit and causes the power switch circuit to turn on more frequently with the control signal to reduce the imbalance of the load.

According to an embodiment of the present disclosure, an apparatus for saturation prevention of a current transformer. The apparatus includes a shunt boost controller configured to provide a control signal to a power switch circuit to cause the power switch to controllably reduce a current flowing from a power source to a load by redirecting at least a portion of the current to a ground. The apparatus includes a feedback network coupled to a terminal receiving the current flowing to the load and the shunt boost controller and configured to provide a feedback signal to the shunt boost controller based on a direct current (DC) voltage representative of the current flowing to the load and to cause the shunt boost controller to provide the control signal to the power switch circuit to turn on when a magnitude of the feedback signal exceeds a threshold magnitude. The apparatus also includes a pulse width modulation (PWM) generator configured to supply a PWM signal to cause the control signal to be provided substantially symmetrical to the power switch circuit and to cause the power switch circuit to turn on with the control signal at a rate based on a frequency of the PWM signal to reduce an imbalance of the load, in which the frequency of the PWM signal is greater than that of the feedback signal.

According to an embodiment of the present disclosure, method of preventing saturation of a current transformer. The method includes sensing alternating current (AC) current on an input line. The method includes converting the sensed AC current into direct current (DC) current to drive a load based on the DC current. The method includes controlling a flow of the DC current from the current transformer to the load based on a control signal. The method includes providing a feedback signal based on a voltage representative to the flow of the DC current to the load. The method includes causing a power switch circuit to turn on with the control signal when a magnitude of the feedback signal exceeds a threshold magnitude. The method includes supplying a pulse width modulation (PWM) signal to cause the control signal to be provided substantially symmetrical to the power switch circuit. The method includes causing the power switch circuit to turn on with the control signal at a rate based on a frequency of the PWM signal to reduce an imbalance of the load during one or more cycles of the AC current, wherein the frequency of the PWM signal is greater than that of the feedback signal.

According to an embodiment of the present disclosure, an apparatus for preventing saturation of a current transformer. The apparatus includes means for sensing alternating current (AC) current on an input line. The apparatus includes means for converting the sensed AC current into direct current (DC) current to drive a load based on the DC current. The apparatus includes means for controlling a flow of the DC current from the current transformer to the load based on a control signal. The apparatus includes means for providing a feedback signal based on a voltage representative to the flow of the DC current to the load. The apparatus includes means for causing a power switch circuit to turn on with the control signal when a magnitude of the feedback signal exceeds a threshold magnitude. The apparatus includes means for supplying a pulse width modulation (PWM) signal to cause the control signal to be provided substantially symmetrical to the power switch circuit. The apparatus includes means for causing the power switch circuit to turn on with the control signal at a rate based on a frequency of the PWM signal to reduce an imbalance of the load during one or more cycles of the AC current, wherein the frequency of the PWM signal is greater than that of the feedback signal.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject technology uses additional pulse width modulation (PWM) signaling to influence the closed loop of a shunt boost controller and reduces the imbalance of a load in an AC cycle. Therefore, the remanence of the current transformer is reduced and the CT does not enter into saturation under all types of load conditions. With the methodology of the subject technology, the accuracy and linearity of the CT is also improved.

Figure 1B:
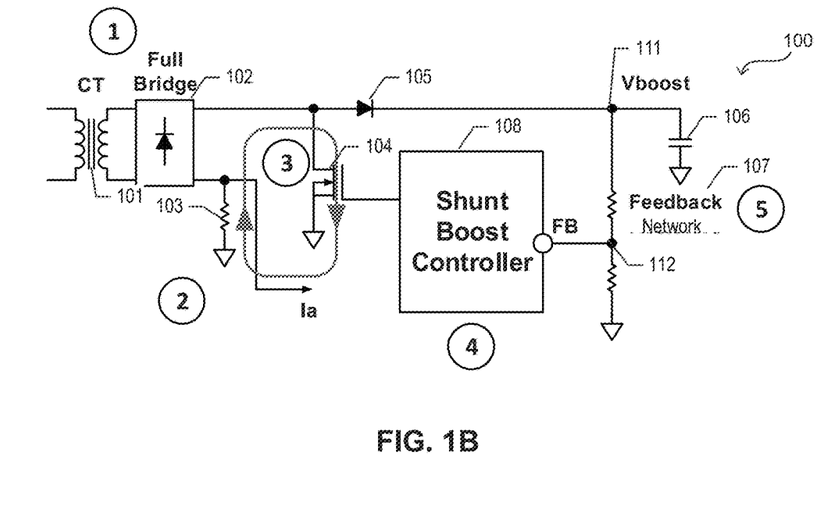

FIGS. 1A and 1B illustrate a schematic diagram of an example of a shunt boost power supply system 100 in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The shunt boost power supply system 100 includes a current transformer (CT) 101, a bridge rectifier 102, a sample circuit element 103, a power switch circuit 104, a unidirectional pass circuit 105, an output storage device 106, a feedback network 107, and a shunt boost controller 108.

The secondary winding of the current transformer 101 is directly coupled to the input of the bridge rectifier 102. The output of the bridge rectifier 102 is directly coupled to a first terminal of the power switch circuit 104. In some implementations, the power switch circuit 104 represents a transistor (e.g., metal-oxide-semiconductor field-effect transistor (MOSFET), or a bipolar junction transistor). In this respect, the first terminal may be a source terminal in some implementations, or a drain terminal in other implementations. The second terminal of the power switch circuit 104 is coupled to ground. The third terminal of the power switch circuit 104 is coupled to an output of the shunt boost controller 108. The output of the bridge rectifier 102 is also coupled to a first terminal of the sample circuit element 103. The second terminal of the sample circuit element 103 is coupled to ground. In some implementations, the sample circuit element 103 includes a resistor.

The unidirectional pass circuit 105 is coupled between the power switch circuit 104 and an output node 111 along a signal path from the bridge rectifier 102. According to various implementations, the unidirectional pass circuit 105 may include a diode to restrict the flow of current in one direction. In particular, the first terminal of the power switch circuit 104 is coupled to a first terminal (e.g., the anode) of the unidirectional pass circuit 105 and a first terminal of the output storage device 106 is coupled to a second terminal (e.g., the cathode) of the unidirectional pass circuit 105. The second terminal of the output storage device 106 is coupled to ground. In some implementations, the unidirectional pass circuit 105 includes an anti-reverse diode.

According to various implementations, the feedback network 107 includes a first resistive element coupled to the second terminal of the unidirectional pass circuit 105 and the first terminal of the output storage device 106, and includes a second resistive element coupled to the first resistive element in series and to ground. According to various implementations, first and second resistive elements each include one or more resistors. However, resistive elements may also be circuits that include transistors, capacitors and/or inductive elements that provide a resistance. An intermediate node 112 between the first resistive element and the second resistive element is coupled to a feedback node of the shunt boost controller 108.

The CT 101 generates AC energy from an input source (e.g., a power line). In some implementations, the input source supplies a 50 Hz AC input. The CT 101 measures the AC current, and produces AC power in its secondary winding that is proportional to the measured AC current in its primary winding. The bridge rectifier 102 is coupled to the secondary winding of the CT 101, and converts the AC power to DC power. For example, the bridge rectifier 102 regulates the AC current into DC current. The bridge rectifier 102 may include an arrangement of four diodes in a bridge circuit configuration. The sample circuit element 103 is configured to convert the DC current into DC voltage for the measurement (Ia). In some aspects, the power switch circuit 104 and the unidirectional pass circuit 105 build up the shunt boost topology. The feedback network 107 is configured to provide a feedback voltage of the output voltage (e.g., VBOOST) back to the shunt boost controller 108 at the feedback node.

As illustrated in FIG. 1A, when the power switch circuit 104 turns off, the voltage at the output of the CT 101 is equivalent to a summation of the output voltage (e.g., $V_{BOOST}$) at the output node 111, a voltage drop across the bridge rectifier 102, a voltage drop across the unidirectional pass circuit 105 (e.g., which may be forward biased), and a voltage drop on the sample circuit element 103. In some implementations, the output voltage, $V_{BOOST}$, is set to be a high value, for example 12 VDC. In this case, the CT 101 has a significant heavy load when the power switch circuit 104 turns off, because the CT 101 outputs the current and high voltage at same time.

As illustrated in FIG. 1B, when the power switch circuit 104 turns on, the voltage output of the CT 101 is equivalent to a summation of the voltage drop across the power switch circuit 104, the voltage drop across the sample circuit element 103, and the voltage drop across the bridge rectifier 102. Typically, the resistance of the power switch circuit 104 during an ON state is significantly low (e.g., several mΩ) and the voltage drop across the power switch circuit 104 can be considered as zero. In this case, when the power switch circuit 104 turns on, the output power of the CT 101 is "light" as it has only the current output and only a very small voltage output.

Figure 2:
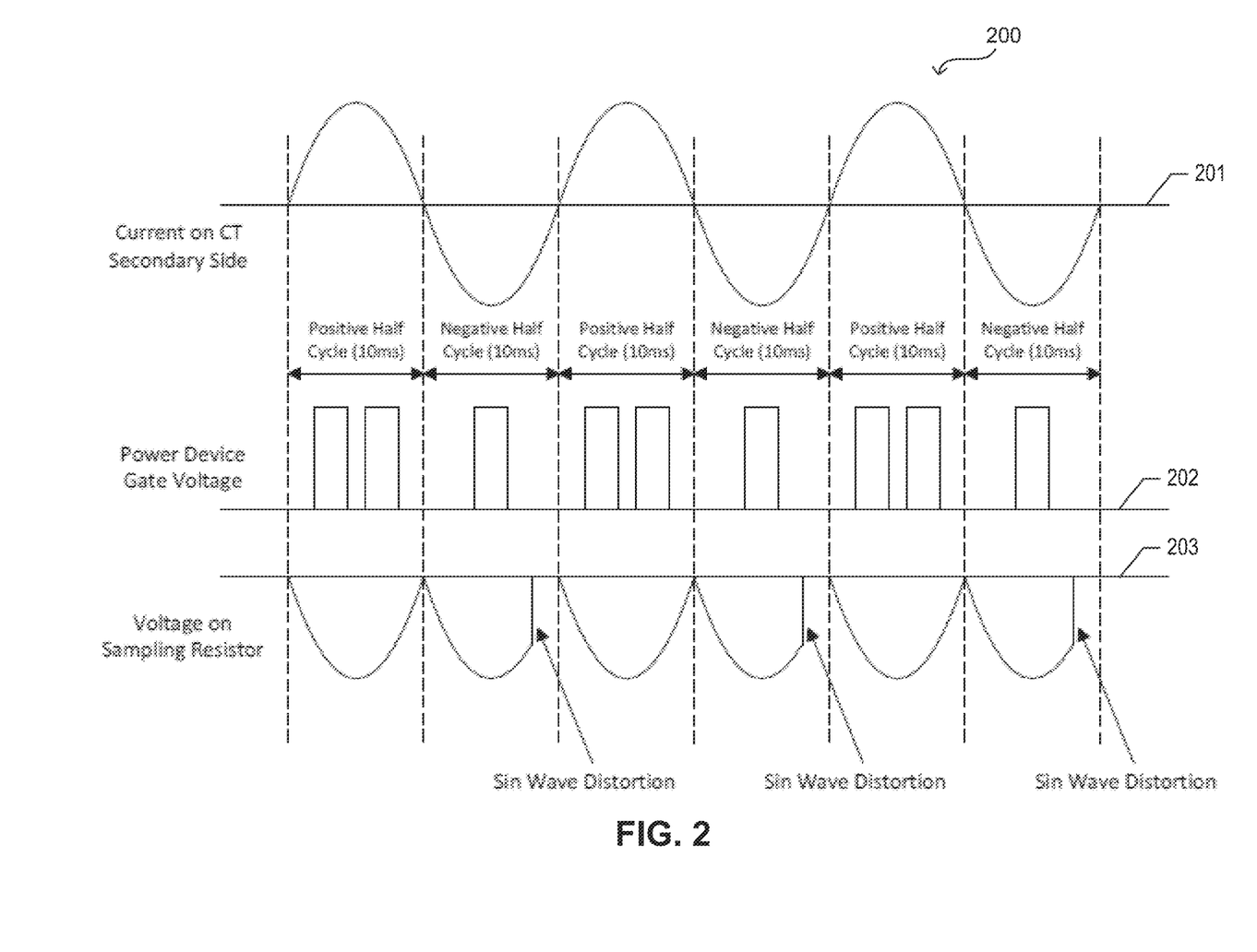
FIG. 2 conceptually illustrates an example of signal waveforms indicating saturation in a shunt boost power supply system in accordance with one or more implementations of the subject technology.

FIG. 2 conceptually illustrates an example of signal waveforms 200 indicating saturation in a shunt boost power supply system in accordance with one or more implementations of the subject technology. The signal waveforms 200 include a sine wave signal 201 as a function of time, which represents the current at the secondary winding of the CT 101. The sine wave signal 201 includes positive and negative cycles, where each cycle has a duration of about 10 ms. The signal waveforms 200 also include a gate voltage signal 202 of the power switch circuit 104. The signal waveforms 200 also include a voltage signal 203 of the sample circuit element 103.

In certain situations, the power switch circuit 104 has heavily unsymmetrical opening time (or state when the power switch circuit 104 turns on) during the positive and negative half cycles of the sine wave signal 201. If this occurs, the CT 101 has an imbalanced load during positive and negative half cycles, which influences the magnetic hysteresis loop of the CT 101 and creates the remanence in the CT 101 resulting in saturation of the CT 101. When saturation of the CT 101 occurs, the output linearity of the CT 101 is heavily influenced and the sensed sine-wave current signal, namely the voltage signal 203, experiences a distortion in each instance when the gate terminal of the power switch circuit 104 is biased with an unsymmetrical power signal from the shunt boost controller 108 (as evidenced by the gate voltage 202 during one or more of the negative cycles of the sine wave signal 201). In this respect, the system level current sensing accuracy may not be fully reliable.

Figure 3:
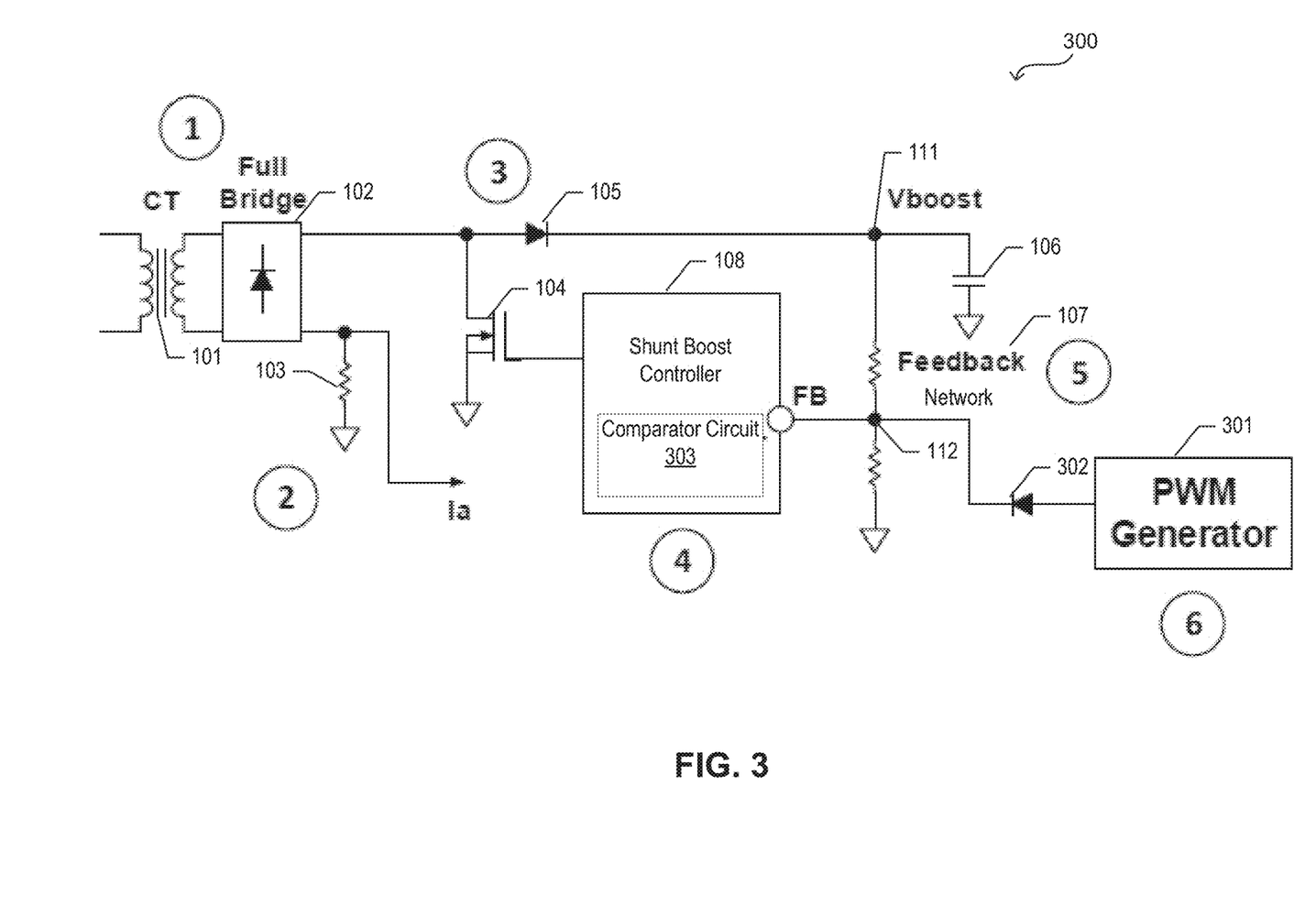
FIG. 3 illustrates a schematic diagram of an example of a shunt boost power supply system with pulse width modulation signaling in accordance with one or more implementations of the subject technology.

FIG. 3 illustrates a schematic diagram of an example of a shunt boost power supply system 300 with pulse width modulation signaling in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The shunt boost power supply system 300 includes the 101, the bridge rectifier 102, the sample circuit element 103, the power switch circuit 104, the unidirectional pass circuit 105, the output storage device 106, the feedback network 107, and the shunt boost controller 108. In the depicted implementation, the shunt boost power supply system 300 also includes a PWM generator 301 and a unidirectional pass circuit 302.

The secondary winding of the CT 101 is directly coupled to the input of the bridge rectifier 102. The output of the bridge rectifier 102 is directly coupled to a first terminal of the power switch circuit 104. The first terminal may be a source terminal in some implementations, or a drain terminal in other implementations. The second terminal of the power switch circuit 104 is coupled to ground. The third terminal of the power switch circuit 104 is coupled to an output of the shunt boost controller 108. The output of the bridge rectifier 102 is also coupled to a first terminal of the sample circuit element 103. The second terminal of the sample circuit element 103 is coupled to ground. In some implementations, the sample circuit element 103 includes a resistor.

The unidirectional pass circuit 105 is coupled between the power switch circuit 104 and an output node 111 along a signal path from the bridge rectifier 102. In particular, the first terminal of the power switch circuit 104 is coupled to a first terminal of the unidirectional pass circuit 105 and a first terminal of the output storage device 106 is coupled to a second terminal of the unidirectional pass circuit 105. The second terminal of the output storage device 106 is coupled to ground. In some implementations, the unidirectional pass circuit 105 includes an anti-reverse diode.

The feedback network 107 includes a first resistive element coupled to the second terminal of the unidirectional pass circuit 105 and the first terminal of the output storage device 106. The feedback network 107 include a second resistive element coupled to the first resistive element in series and to ground. The intermediate node 112 between the first resistive element and the second resistive element is coupled to the feedback node of the shunt boost controller 108 and to a first terminal of the unidirectional pass circuit 302. The output of the PWM generator 301 is coupled to a second terminal of the unidirectional pass circuit 302.

In FIG. 3, the shunt boost power supply system 300 uses additional PWM signaling from the PWM generator 301 to interject a signal into the closed loop of the shunt boost controller 108 and reduce the imbalance of the load (or at the output node 111) in the AC cycle. Therefore, the remanence of the CT 101 is reduced and the CT 101 does not enter into a saturation state under all types of load conditions. In this respect, the accuracy and linearity of the CT 101 is also improved.

The PWM generator 301 is configured to generate a PWM signal with a significantly short duration logical high (or ON) cycle (e.g., 4% duty cycle) and a frequency that is significantly greater than the 50 Hz AC input (e.g., 800 Hz). The PWM generator 301 feeds the PWM signal to the feedback node of the shunt boost controller 108 via the unidirectional pass circuit 302 (e.g., common node with the intermediate node 112). When the PWM signal is a logical high, the voltage on the feedback node is much higher than the regulated feedback voltage (usually, 1.2 VDC or lower) and forces the power switch circuit 104 to turn on. In other words, the PWM generator 301 breaks the closed loop of the shunt boost controller 108 temporarily and forces the shunt boost controller 108 to be rebalanced.

In some implementations, the shunt boost controller 108 includes a comparator circuit 303 that compares the regulated feedback voltage received through the feedback node to a reference voltage of the shunt boost controller 108. In some aspects, the reference voltage is set to 1.2 VDC. The regulated feedback voltage may vary depending on the properties of the resistive elements that make up the feedback network 107. In some implementations, the ratio of the first resistive element to the second resistive element is 1:N, where N is a positive integer. For example, the ratio may be 1:10, which would reduce the voltage observed at the output node 111 by a factor of 10. For example, if the output node has a voltage of 12V, then the feedback network 107 produces a regulated feedback voltage of 1.2V at the intermediate node 112. In some aspects, the ratio is based on the reference voltage and the regulated feedback voltage. The regulated feedback voltage is then compared to the reference voltage to determine whether to turn on or off the gate terminal of the power switch circuit 104. If the regulated feedback voltage is greater than the reference voltage, then the comparator circuit 303 drives a gate drive signal to turn on the gate terminal of the power switch circuit 104. In some aspects, the gate drive signal is set to a voltage of 8V to turn on the gate terminal, but may vary depending on implementation. In this respect, the node between the bridge rectifier 102 and the unidirectional pass circuit 103 is pulled to ground, thus causing the voltage at the output node 111 to decrease. If the regulated feedback voltage is less than the reference voltage, then the comparator circuit 303 drives the gate drive signal to turn off the gate terminal of the power switch circuit 104. In some aspects, the gate drive signal is set to 0V to turn off the gate terminal, but may vary depending on implementation.

Figure 4:
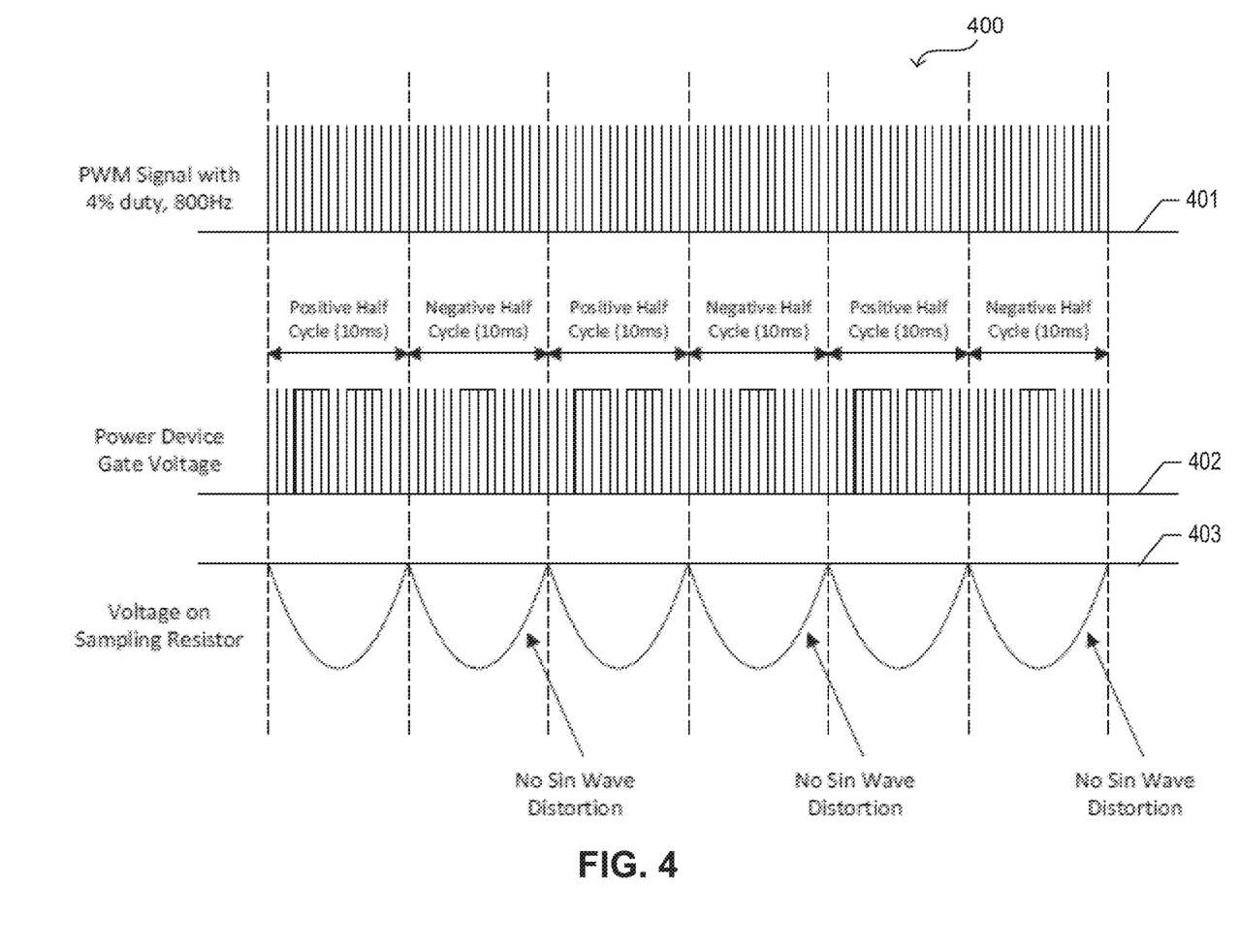
FIG. 4 conceptually illustrates an example of signal waveforms indicating saturation prevention in a shunt boost power supply system in accordance with one or more implementations of the subject technology.

FIG. 4 conceptually illustrates an example of signal waveforms 400 indicating saturation prevention in a shunt boost power supply system in accordance with one or more implementations of the subject technology. The signal waveforms 400 include a PWM signal 401 as a function of time, which represents the PWM signaling output from the power generator 301. As discussed above, the PWM signal has a significantly short duration logical high (or ON) cycle (e.g., 4% duty cycle) and a frequency that is significantly greater than the 50 Hz AC input (e.g., 800 Hz). The signal waveforms 400 also include a gate voltage signal 402 of the power switch circuit 104. The signal waveforms 400 also include a voltage signal 403 of the sample circuit element 103.

The gate voltage signal 402 depicts the output signaling of the shunt boost controller 108 based on the feedback signaling (e.g., unsymmetrical low-frequency signal) that is interposed in time with the output signaling of the shunt boost controller 108 based on the PWM signaling (e.g., symmetrical high-frequency, short duty-cycle signal). With the additional small duty-cycle, high frequency signal, namely the PWM signal 401, the power switch circuit 104 can be turned on and turned off more frequently, but is well-distributed (or substantially symmetrical) in the positive and negative half cycles. As a result, this PWM signaling causes the CT 101 to have a well-balanced load in its 50 Hz AC cycle and eliminates the remanence of the CT 101. As illustrated in FIG. 4, the voltage signal 403 shows no signs of any sine wave distortion during the negative cycles of the sine wave signal 201 because saturation of the CT 101 is prevented. In effect, the addition of the PWM signaling to the shunt boost topology improves the accuracy of the sensed current signal and allows the overall system level distortion to be controlled to an acceptable level.

Figure 5:
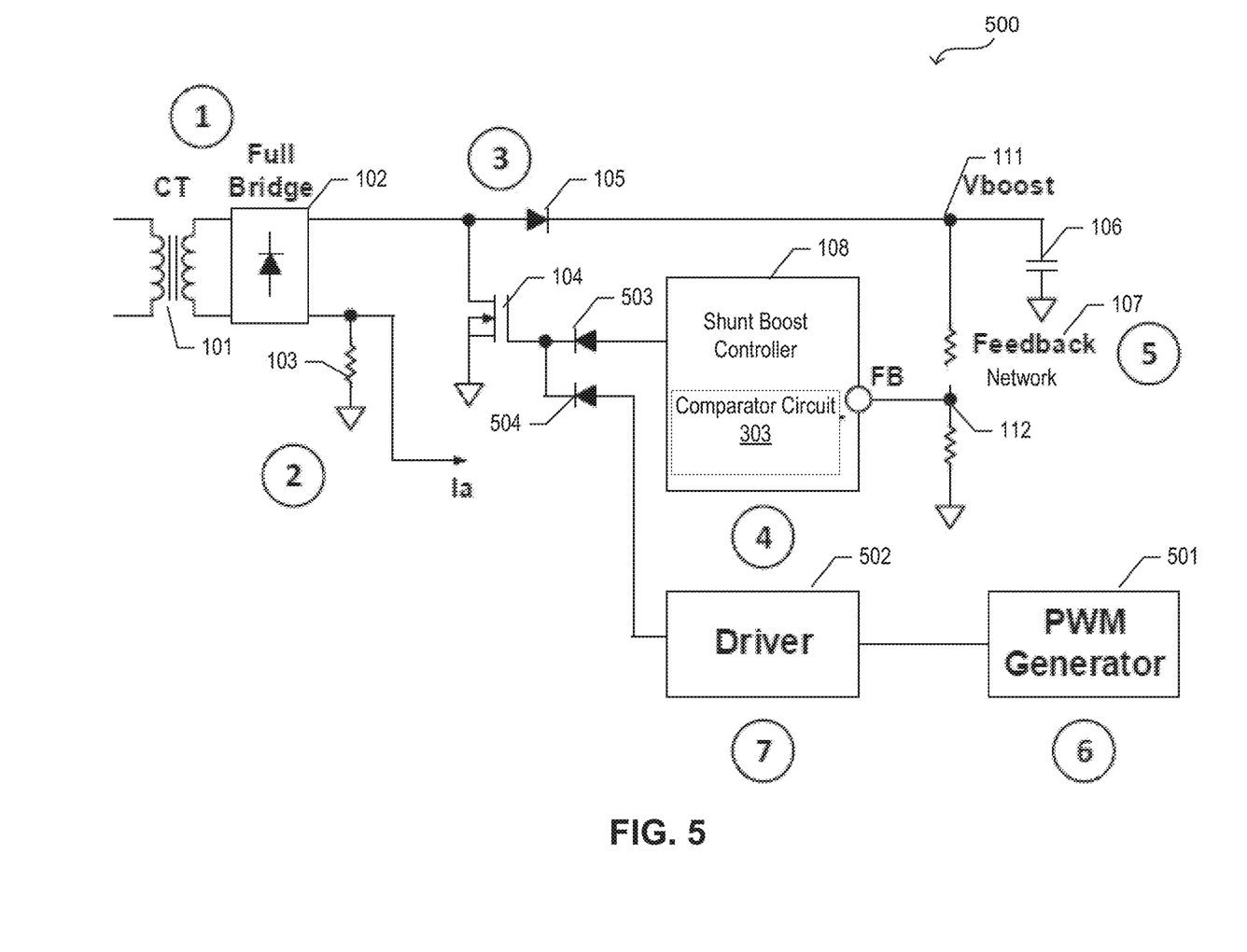
FIG. 5 illustrates a schematic diagram of another example of a shunt boost power supply system with pulse width modulation signaling in accordance with one or more implementations of the subject technology.

FIG. 5 illustrates a schematic diagram of another example of a shunt boost power supply system 500 with pulse width modulation signaling in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The shunt boost power supply system 500 includes the 101, the bridge rectifier 102, the sample circuit element 103, the power switch circuit 104, the unidirectional pass circuit 105, the output storage device 106, the feedback network 107, and the shunt boost controller 108. In contrast to FIG. 3, the shunt boost power supply system 500 includes a PWM generator 501, a driver 502, a unidirectional pass circuit 503, and a unidirectional pass circuit 504.

The secondary winding of the CT 101 is directly coupled to the input of the bridge rectifier 102. The output of the bridge rectifier 102 is directly coupled to a first terminal of the power switch circuit 104. The first terminal may be a source terminal in some implementations, or a drain terminal in other implementations. The second terminal of the power switch circuit 104 is coupled to ground. The third terminal of the power switch circuit 104 is coupled to an output of the shunt boost controller 108. The output of the bridge rectifier 102 is also coupled to a first terminal of the sample circuit element 103. The second terminal of the sample circuit element 103 is coupled to ground. In some implementations, the sample circuit element 103 includes a resistor.

The unidirectional pass circuit 105 is coupled between the power switch circuit 104 and an output node 111 along a signal path from the bridge rectifier 102. In particular, the first terminal of the power switch circuit 104 is coupled to a first terminal of the unidirectional pass circuit 105 and a first terminal of the output storage device 106 is coupled to a second terminal of the unidirectional pass circuit 105. The second terminal of the output storage device 106 is coupled to ground. In some implementations, the unidirectional pass circuit 105 includes an anti-reverse diode.

The feedback network 107 includes a first resistive element coupled to the second terminal of the unidirectional pass circuit 105 and the first terminal of the output storage device 106. The feedback network 107 include a second resistive element coupled to the first resistive element in series and to ground. The intermediate node 112 between the first resistive element and the second resistive element is coupled to the feedback node of the shunt boost controller 108.

The output of the PWM generator 501 is coupled to an input to the driver 502. The output of the shunt boost controller is coupled to a first terminal of the unidirectional pass circuit 503. The output of the driver 502 is coupled to a first terminal of the unidirectional pass circuit 504. The second terminals of the unidirectional pass circuits 503 and 504 are coupled to a common node at the gate terminal of the power switch circuit 104.

In FIG. 5, the PWM signal is added directly to the gate terminal of the power switch circuit 104 via the unidirectional pass circuit 504, instead of adding the PWM signal at the feedback node of the shunt boost controller 108 as depicted in FIG. 4. However, this implementation may increase the system build-of-materials (BOM) cost, because another driver (e.g., driver 502) of the power switch circuit 104 and another diode (e.g., the unidirectional pass circuit 503) are needed. In some implementations, the PWM signal and signal output of the shunt boost controller 108 are coupled to the gate terminal of the power switch circuit 104 through a logical gate (e.g., OR gate, XOR gate, NOR gate, AND gate). For example, the respective second terminals of unidirectional pass circuit 503 and unidirectional pass circuit 504 may be coupled to respective inputs of an OR gate so that either unidirectional pass circuit 503 or unidirectional pass circuit 504 may provide a control signal to the gate terminal of the power switch circuit 104 to activate the power switch circuit 104.

When the PWM signal is being fed through the driver 502, the unidirectional pass circuit 504 is forward-biased to drive the PWM signal to the gate terminal of the power switch circuit 104. Concurrently, the unidirectional pass circuit 503 is reversed-biased, thus limiting the PWM signal to be fed to the shunt boost controller 108.

Figure 6:
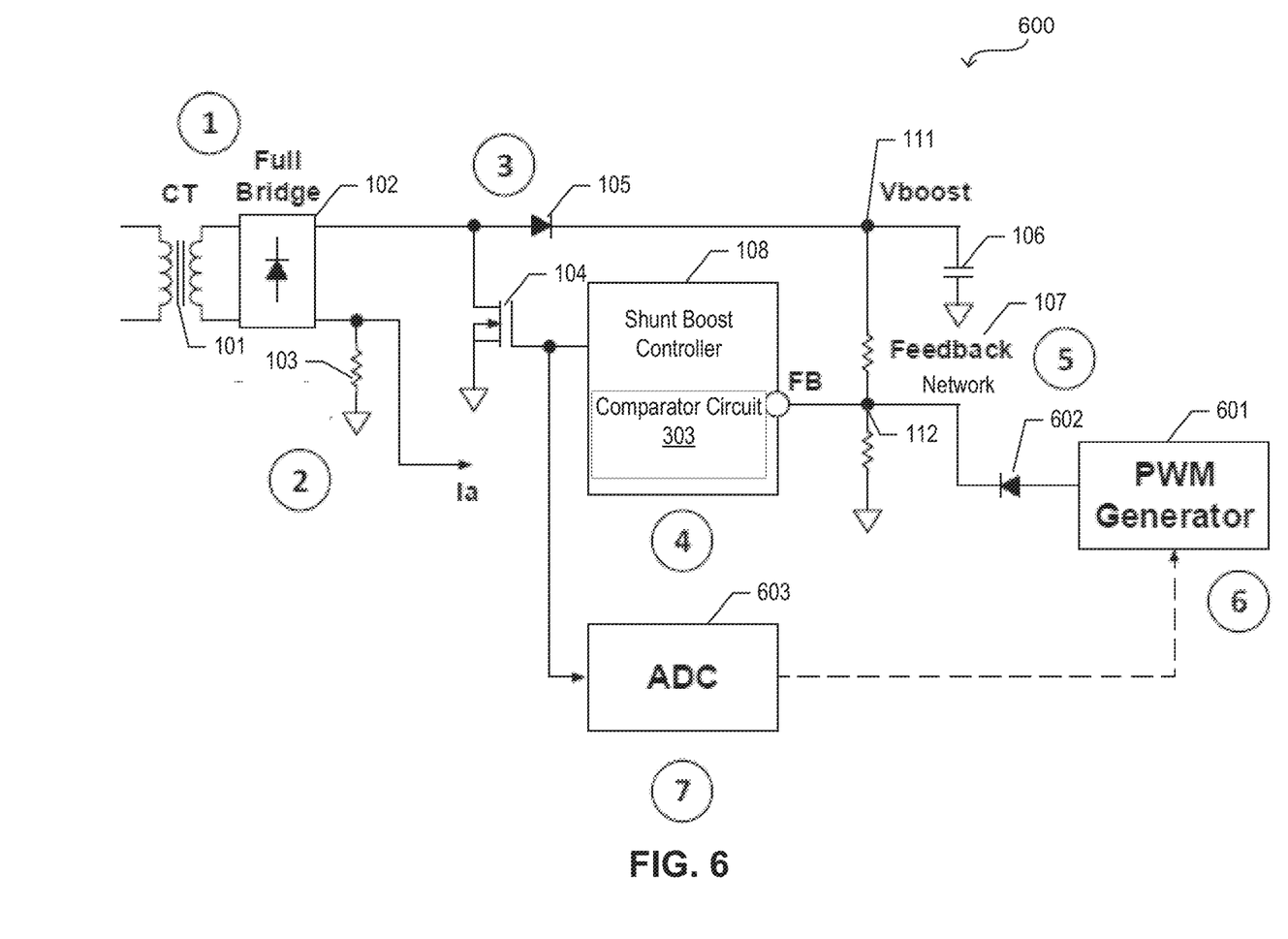
FIG. 6 illustrates a schematic diagram of an example of a shunt boost power supply system with pulse width modulation signaling and an analog-to-digital converter (ADC) in accordance with one or more implementations of the subject technology.

FIG. 6 illustrates a schematic diagram of an example of a shunt boost power supply system 600 with pulse width modulation signaling and an analog-to-digital converter (ADC) in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The shunt boost power supply system 600 includes the 101, the bridge rectifier 102, the sample circuit element 103, the power switch circuit 104, the unidirectional pass circuit 105, the output storage device 106, the feedback network 107, and the shunt boost controller 108. In contrast to FIG. 3, the shunt boost power supply system 600 includes a PWM generator 601, a unidirectional pass circuit 602, and an ADC 603.

The secondary winding of the CT 101 is directly coupled to the input of the bridge rectifier 102. The output of the bridge rectifier 102 is directly coupled to a first terminal of the power switch circuit 104. The first terminal may be a source terminal in some implementations, or a drain terminal in other implementations. The second terminal of the power switch circuit 104 is coupled to ground. The third terminal of the power switch circuit 104 is coupled to an output of the shunt boost controller 108. The output of the bridge rectifier 102 is also coupled to a first terminal of the sample circuit element 103. The second terminal of the sample circuit element 103 is coupled to ground. In some implementations, the sample circuit element 103 includes a resistor.

The unidirectional pass circuit 105 is coupled between the power switch circuit 104 and an output node 111 along a signal path from the bridge rectifier 102. In particular, the first terminal of the power switch circuit 104 is coupled to a first terminal of the unidirectional pass circuit 105 and a first terminal of the output storage device 106 is coupled to a second terminal of the unidirectional pass circuit 105. The second terminal of the output storage device 106 is coupled to ground. In some implementations, the unidirectional pass circuit 105 includes an anti-reverse diode.

The feedback network 107 includes a first resistive element coupled to the second terminal of the unidirectional pass circuit 105 and the first terminal of the output storage device 106. The feedback network 107 include a second resistive element coupled to the first resistive element in series and to ground. The intermediate node 112 between the first resistive element and the second resistive element is coupled to the feedback node of the shunt boost controller 108.

The output of the PWM generator 601 is coupled to a first terminal of the unidirectional pass circuit 602. The output of the driver 502 is coupled to a first terminal of the unidirectional pass circuit 504. The second terminal of the unidirectional pass circuit 602 is coupled to the intermediate node 112. The gate terminal and the output of the shunt boost controller 108 are commonly coupled to an input to the ADC 603. The output of the ADC 603 is optionally coupled to an input to the PWM generator 601.

In some implementations, the gate drive signal at the gate terminal of the power switch circuit 104 is sensed. If the gate drive signal in the positive half cycle is significantly unsymmetrical, then in the next 50 Hz cycle, the PWM generator 601 generates the small duty-cycle, high frequency PWM signal on the feedback node of the shunt boost controller 108. In particular, the PWM generator 601 drives the PWM signal to the intermediate node 112 through the unidirectional pass circuit 602. In some implementations, the ADC 603 receives the gate drive signal as an analog signal and converts the gate drive signal into a digital signal that is then processed by the PWM generator 601 as a trigger to generate the PWM signal. As discussed in reference to FIG. 3, the PWM generator 601 drives the PWM signal to interject the closed loop network of the shunt boost controller 108 and supersede the feedback signal as the controlling signal to the gate terminal of the power switch circuit 104 when the PWM signal is a logical high. In some aspects, the digital signal may represent a sequence of binary values that indicate the unsymmetrical state of the gate drive signal.

This implementation may have an additional BOM cost due to the addition of the ADC 603. However, one of the benefits achieved from this implementation is that the power switch circuit 104 is not switched between the ON and OFF states all the time in a high frequency and the total system power dissipation may be lower.

Figure 7:
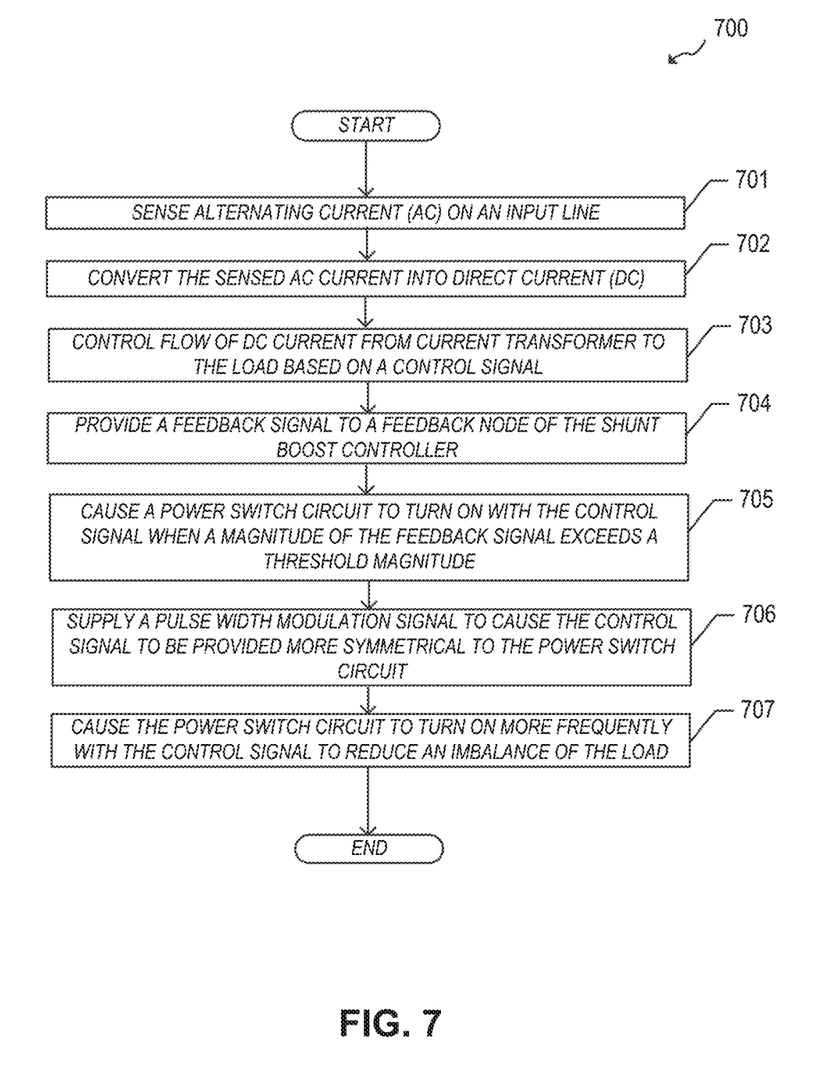
FIG. 7 illustrates a flowchart of an example process for saturation prevention of a current transformer in accordance with one or more implementations of the subject technology.

FIG. 7 illustrates a flowchart of an example process 700 for saturation prevention of a current transformer in accordance with one or more implementations of the subject technology. Further for explanatory purposes, the blocks of the sequential process 700 are described herein as occurring in serial, or linearly. However, multiple blocks of the process 700 may occur in parallel. In addition, the blocks of the process 700 need not be performed in the order shown and/or one or more of the blocks of the process 700 need not be performed.

The process 700 starts at step 701, where AC current is sensed on an input line. Next, at step 702, the sensed AC current is converted into direct current (DC) current to drive a load based on the DC current. Next, at step 703, the flow of the DC current to the load is controlled based on a control signal. The control signal may be provided by a shunt boost controller in some aspects, or the control signal is provided by a pulse width modulation (PWM) generator in other aspects. Subsequently, at step 704, a feedback signal from the feedback network is provided to a feedback node of the shunt boost controller. Next, at step 705, the shunt boost controller causes a power switch circuit to turn on with the control signal when a magnitude of the feedback signal exceeds a threshold magnitude. Subsequently, at step 706, a PWM signal is supplied from the PWM generator coupled to the shunt boost controller cause the control signal to be provided more symmetrical to the power switch circuit. Next, at step 707, the control signal causes the power switch circuit to turn on more frequently when the PWM signal is a logical high to reduce an imbalance of the load (e.g., the imbalance being caused by any unsymmetrical properties of the CT current near or at saturation) during one or more cycles of the AC current. For example, the PWM generator interjects the PWM signal as the control signal to the power switch circuit at a rate that corresponds to the frequency of the PWM signal and causes a substantially symmetrical power-on/off sequence by the power switch circuit to thereby drive the DC current more balanced to the load.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The phrases "in communication with" and "coupled" mean in direct communication with or in indirect communication with via one or more components named or unnamed herein (e.g., a memory card reader).

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" or "exemplary" is used herein to mean "serving as an example or illustration." Any aspect or design described herein as "example" or "exemplary" is not necessarily to be construed as preferred or advantageous over other aspects or designs.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used. Unless otherwise described herein, the phrase "meet", "meeting", "satisfy", or "satisfying" a threshold may be interpreted to mean being equal with the threshold, being below the threshold, or being above the threshold, so long as the condition to be satisfied is predetermined prior to the threshold being satisfied.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for saturation prevention of a current transformer, comprising:
a shunt boost controller having an output coupled to a control node of a power switch circuit, the shunt boost controller configured to provide a control signal to the power switch circuit to cause the power switch to controllably reduce a current flowing from a power source to a load by redirecting at least a portion of the current to a ground;
a feedback network coupled to a terminal receiving the current flowing to the load, the feedback network configured to provide a feedback signal to the shunt boost controller based on a direct current (DC) voltage representative of the current flowing to the load and to cause the shunt boost controller to provide the control signal to the power switch circuit to turn on when a magnitude of the feedback signal exceeds a threshold magnitude;
a pulse width modulation (PWM) generator, separate from the shunt boost controller, configured to supply a PWM signal to modify the control signal and to cause the power switch circuit to turn on with the control signal at a rate based on a frequency of the PWM signal to reduce an imbalance of the load, wherein the frequency of the PWM signal is greater than that of the feedback signal;
a first unidirectional pass circuit configured to couple the output of the shunt boost controller with a control node of the power switch; and
a second unidirectional pass circuit configured to pass the PWM signal.

2. The apparatus of claim 1, wherein the PWM signal has a voltage that is greater than a voltage of the feedback signal when the PWM signal is a logic high; and
wherein the PWM signal causes the power switch circuit to turn on when the PWM signal is a logic high.

3. The apparatus of claim 1, wherein the PWM signal is provided to a feedback node of the feedback network to override the feedback signal provided to the shunt boost controller and to cause the power switch circuit to turn on when a magnitude of the PWM signal exceeds the threshold magnitude.

4. The apparatus of claim 1, further comprising:
a sense terminal for sensing an alternating current (AC) current provided to a rectifier by a transformer,
wherein the rectifier provides the current flowing to the load, and
wherein the PWM signal has a smaller duty-cycle than that of the sensed AC current.

5. The apparatus of claim 1, further comprising:
a sense terminal for sensing an alternating current (AC) current provided to a rectifier by a transformer,
wherein the rectifier provides the current flowing to the load, and
wherein the PWM signal has a higher frequency than that of the sensed AC current.

6. The apparatus of claim 1, wherein the feedback network comprises a resistive divider, wherein the resistive divider comprises a first resistive element and a second resistive element connected in series, wherein an intermediate node between the first resistive element and the second resistive element is coupled to a feedback node of the shunt boost controller.

7. The apparatus of claim 6, wherein a ratio of the first resistive element to the second resistive element is equivalent to a ratio of 1 to N, where N is a positive integer.

8. The apparatus of claim 1, wherein the feedback signal has a voltage that is compared to a reference voltage, wherein the shunt boost controller drives a gate drive signal with a first voltage to power on the power switch circuit when the voltage of the feedback signal exceeds the reference voltage, and wherein the shunt boost controller drives the gate drive signal with a second voltage to power off the power switch circuit when the voltage of the feedback signal does not exceed the reference voltage, and wherein the first voltage is greater than the second voltage.

9. The apparatus of claim 1, further comprising:
a current transformer configured to sense alternating current (AC) current on an input line and harvest the sensed AC current from the input line;
a bridge rectifier configured to convert the sensed AC current into direct current (DC) current to drive a load based on the DC current; and
a sample circuit element coupled to an output of the bridge rectifier, the sample circuit element being configured to convert the DC current into DC voltage for measurement.

10. The apparatus of claim 9, further comprising:
a unidirectional pass circuit coupled between the power switch circuit and the load along a signal path from the bridge rectifier, the unidirectional pass circuit being configured to forward bias the DC current from the bridge rectifier to the load when the power switch circuit is powered off and limit current flow from the load to the power switch circuit when the power switch circuit is turned on.

11. The circuit of claim 1, wherein the second unidirectional pass circuit is configured to pass the PWM signal to a control node of a power transistor of power switch circuit.

12. A power supply circuit comprising:
a current transformer configured to wirelessly capture an AC signal from a conductor passing through the current transformer;
a full bridge rectifier configured to receive the AC signal and provide a rectified signal;
a first unidirectional pass circuit coupled with the full bridge rectifier and configured to receive the rectified signal and provide a output supply signal of the power supply circuit;
a shunt switch configured to selectively shunt current from the rectified signal;
a controller having an output coupled to a control node of the shunt switch via a second unidirectional pass circuit comprising a diode;
a feedback network coupled output supply signal, the feedback network configured to provide a representation of a voltage of the output supply signal to the controller;
a PWM generator configured to provide a PWM signal to modify a control signal of the shunt switch to reduce an imbalance of load on the current transformer; and
a third unidirectional pass circuit configured to pass the PWM signal.

13. The power supply circuit of claim 12, wherein the PWM signal is coupled directly with the representation of the output voltage of the feedback circuit via the third unidirectional pass circuit.

14. The power supply circuit of claim 13, including an analog-to-digital converter (ADC) coupled to a gate terminal of the shunt switch to sense a voltage on the gate terminal, the ADC coupled to an input of the PWM generator to trigger generation of the PWM signal based on the sensed voltage of the gate terminal.

15. The power supply circuit of claim 14, wherein the PWM generator generates the PWM signal in a second portion of a cycle of the AC signal when the voltage on the gate terminal is sensed by the ADC to be unsymmetrical in a first portion of the cycle, wherein the first portion precedes the second portion.

16. The power supply circuit of claim 12, wherein the PWM signal is coupled to a gate terminal of the shunt switch via the third unidirectional pass circuit.

17. The power supply circuit of claim 16, wherein the control circuit includes a comparator configured to compare the representation to the threshold.

18. The power supply circuit of claim 17, wherein an output of the comparator is coupled to the control node of the shunt switch.

19. A method of operating a power supply to prevent saturation of a current transformer of the power supply, the method comprising:
generating an AC signal at an output of a current transformer;
rectifying the AC signal to provide a rectified signal at an output of a rectifier;
rectifying output current of the power supply using an unidirectional pass circuit coupled directly with the rectifier;
providing a representation of an output voltage of the power supply via a feedback network;
generating a PWM signal and comparing the PWM signal to a reference voltage;
using a power switch, shunting current of the rectified signal from the output current when the representation is higher than a threshold, regardless of a state of the PWM signal; and
using the power switch, shunting current of the rectified signal from the output current when the PWM signal is in a first state and the PWM signal exceeds the reference voltage.

* * * * *